United States Patent
Althin et al.

(10) Patent No.: US 7,308,486 B2
(45) Date of Patent: Dec. 11, 2007

(54) MOBILE GUIDE COMMUNICATIONS SYSTEM

(75) Inventors: Mathias Althin, Stockholm (SE); Björn Evers, Uppsala (SE); Jonas Colmsiö, Vällingby (SE)

(73) Assignee: Accenture Global Services GmbH

( * ) Notice: Subject to any disclaimer, the term of this patent is extended or adjusted under 35 U.S.C. 154(b) by 576 days.

(21) Appl. No.: 10/010,657

(22) Filed: Dec. 6, 2001

(65) Prior Publication Data

US 2003/0110216 A1    Jun. 12, 2003

(51) Int. Cl.
*G06F 15/16*    (2006.01)

(52) U.S. Cl. .................. 709/219; 709/217; 709/218; 709/229; 707/1; 707/3

(58) Field of Classification Search .......... 709/21–219, 709/217–225, 229–232, 227; 707/1, 3
See application file for complete search history.

(56) References Cited

U.S. PATENT DOCUMENTS

| | | | | |
|---|---|---|---|---|
| 5,351,186 A * | 9/1994 | Bullock et al. ................ 705/1 |
| 5,461,371 A * | 10/1995 | Matsumoto et al. ... 340/825.25 |
| 6,128,549 A * | 10/2000 | Swartz et al. ............... 700/225 |
| 6,337,856 B1 * | 1/2002 | Schanhals et al. .......... 370/352 |
| 6,459,388 B1 * | 10/2002 | Baron ......................... 340/996 |
| 6,714,797 B1 * | 3/2004 | Rautila ..................... 455/552.1 |
| 6,748,424 B1 * | 6/2004 | Usuda ......................... 709/217 |
| 6,785,539 B2 * | 8/2004 | Hale et al. ............... 455/422.1 |
| 2001/0003181 A1 * | 6/2001 | Miyamoto ..................... 707/1 |
| 2001/0054087 A1 * | 12/2001 | Flom et al. ................. 709/218 |
| 2002/0068991 A1 * | 6/2002 | Fitzsimmons, Jr. ......... 700/214 |
| 2002/0077905 A1 * | 6/2002 | Arndt et al. .................. 705/14 |
| 2002/0178154 A1 * | 11/2002 | Shirota ......................... 707/3 |

FOREIGN PATENT DOCUMENTS

JP        2002245193 A   *   8/2002

* cited by examiner

*Primary Examiner*—Saleh Najjar
*Assistant Examiner*—Liang-che Alex Wang
(74) *Attorney, Agent, or Firm*—Fish & Richardson P.C.

(57) ABSTRACT

The invention relates to a mobile guide communications system. A visitor at an exhibition may use the system to obtain information associated with a specific object and to display the information on a portable terminal. In an implementation, the system includes at least one portable device, a plurality of object servers and at least one central server. The portable device may include a display means, an infrared (IR) communication unit and a wireless communication unit. Each object server may include an IR communication unit, and the central server may include a wireless communication unit.

18 Claims, 2 Drawing Sheets

MOBILE GUIDE COMMUNICATIONS SYSTEM

BACKGROUND OF THE INVENTION

This invention relates to a mobile guide communications system. In particular, the invention pertains to a mobile guide system and communications technique for an exhibition.

Art galleries, museums and other exhibitors use many different types of systems to guide visitors through an exhibit of objects. For example, brochures including maps, audio guides and human guides such as docents are used. These guides all have limitations.

A brochure has static information and does not offer the user the ability to ask questions. Further it is typically impossible to present information about all of the exhibited objects in the brochure. In addition, the user must read the information which diverts attention away from the object.

An audio guide, which may be an audio play back system that gives a visitor information about the objects via a special portable audio player, does not divert attention away from the exhibit objects. For example, audio tape systems play the information about objects in an exhibition in a preset sequence. The visitor can listen to the information as she strolls past the objects, and some systems may permit the information flow to be altered. In one such audio system, a visitor may enter a number into the portable audio player to receive information about a desired object. However, such audio systems are still limited because the visitor still has no way of selecting information about certain objects or further information about a selected object. Further, such audio guides cannot show any images.

A human guide, such as a docent in a museum, might seem to be the best guide. The guide can show pictures, give personal tours, answer questions and so on. The guide is therefore more personalized, but tours are often given to large groups and different visitors demands and needs must be satisfied. A particular visitor may not be able to enjoy the objects at his or her own pace because of group considerations.

Some further disadvantages concerning current guide systems include that the information provided is static, interactivity is poor, and it is not possible to store information about all the objects in an exhibit. Further, typical guide systems have poor multimedia capabilities.

If a visitor uses a portable terminal such as a handheld computer, information could be presented on the display screen. But to display information associated with a specific object of interest requires access to such information. Software may be provided to enable a user to enter a specific identification number corresponding to a specific object, or to click on a thumbnail picture of the object shown among a number of thumbnail pictures of different objects shown on the screen. But such a system may be cumbersome for the user when a large number of objects are present at an exhibition, and it may be difficult to fit all the thumbnail pictures of all the objects on the display. Further, entering an identification number is not user-friendly.

SUMMARY OF THE INVENTION

Presented is an interactive guide which is user friendly. In particular, an implementation of the present invention is a mobile guide system that includes a portable terminal, multiple object servers and a central server.

In an implementation, a mobile guide communications system includes at least one portable device including at least one display means, an infra-red (IR) communication unit and a wireless communication unit. Also included is a plurality of object servers, each object server associated with an object and including an IR communication unit configured to communicate with the portable devices, and at least one central server including a memory and a wireless communication unit configured to communicate with the portable devices.

The invention may include one or more of the following features. The display means may be capable of displaying at least one of a multimedia presentation, a text display, a graphics display and an audio presentation. The portable device may further include an internet connection, and may further include processing circuitry configured to obtain an object identification code from an object server, to transmit the object identification code to the central server and obtain information concerning an object, and to present the information to a user. The object server may further include a memory including an object identification code associated to a specific object, and software code means for causing the object server to transfer the object identification code when requested by a portable device. The object server may operate in a wait mode until communications are established with a portable device, and the object server may be located within a predetermined distance from its associated specific object. The central server may include a wireless communications unit, a database including information associated with different objects at an exhibition, and a unique object identification code for each object. The central server may also include software for causing the central server to receive a request for information concerning a specific object, wherein the request includes an object identification code. The central server may be capable of accessing the Internet, the terminal may also include software adapted for causing a terminal client to obtain an object identity code from the specific object server, when the terminal is in range of an IR communications unit of the object server obtain requested object information from the central server, and present the obtained information.

Another implementation pertains to a method in a mobile guide system. The technique includes establishing an IR connection between a mobile terminal and a specific object server associated with a specific object, transferring a specific object identity code from a memory of the specific object server to the terminal over the IR connection, establishing a wireless connection between the terminal and a central server, transferring the object identity code to the central server, retrieving requested information from a database of the central server based on the object identity code, transferring the retrieved information to the terminal, and presenting the information on a display of the terminal. The information may be presented as at least one of an Internet link, a multimedia display, a text display, a graphics display and an audio presentation.

Yet another implementation is a machine-accessible medium, which when accessed causes a machine to obtain an object identification code from an object server, transmit the object identification code to a central server, receive information concerning an object associated with the object identification code, and display the information for a user of the portable device. Instructions may be included that causes the portable device to display the information as one of a multimedia presentation, a graphics presentation, a text display, and an audio presentation.

Another implementation is a computer-readable medium having stored thereon at least one sequence of instructions for causing a digital processing system to perform operations including obtaining an object identification code from an object server, transmitting the object identification code to a central server, receiving information concerning an object associated with the object identification code, and displaying the information for a user of the portable device.

The computer-readable medium may further include one or more of the following features. The medium may include instructions to cause the portable device to display the information as one of a multimedia presentation, a graphics presentation, a text display, and an audio presentation. The object identification code may be obtained from the object server over an infra-red link, and the object identification code may be transmitted over a wireless link to the central server A system according to the invention may be used, for example, at an art exhibition at a museum and the like. A visitor would be allocated a portable terminal, and establishes a wireless connection between the terminal and a central server. The visitor moves around the exhibition carrying the terminal, and when he wishes to obtain information about a specific object, enters the range of an IR communication unit associated with a specific object server. An IR connection would then be established between the terminal and the specific object server, and a specific object identity code sent from the specific object server to the terminal. The terminal then transmits the specific object identity code to the central server over the wireless connection and requests information associated to the specific object identity. Next, the central server retrieves the information record associated with the specific object identity from a data base and sends the data to the terminal over the radio connection. The information is then presented on a display of the terminal.

An advantage of the present invention is that the visitor can choose what information he or she wants to receive at a particular time, choose the order of the objects to be presented, and choose the level of detail of the information. Another advantage is that information can be displayed in different formats, such as pictures, sounds and video clips to give the exhibition experience a new dimension.

The details of one or more embodiments of the invention are set forth in the accompanying drawings and the description below. Other features and advantages of the invention will be apparent from the description and drawings, and from the claims.

DETAILED DESCRIPTION

Figure 1:
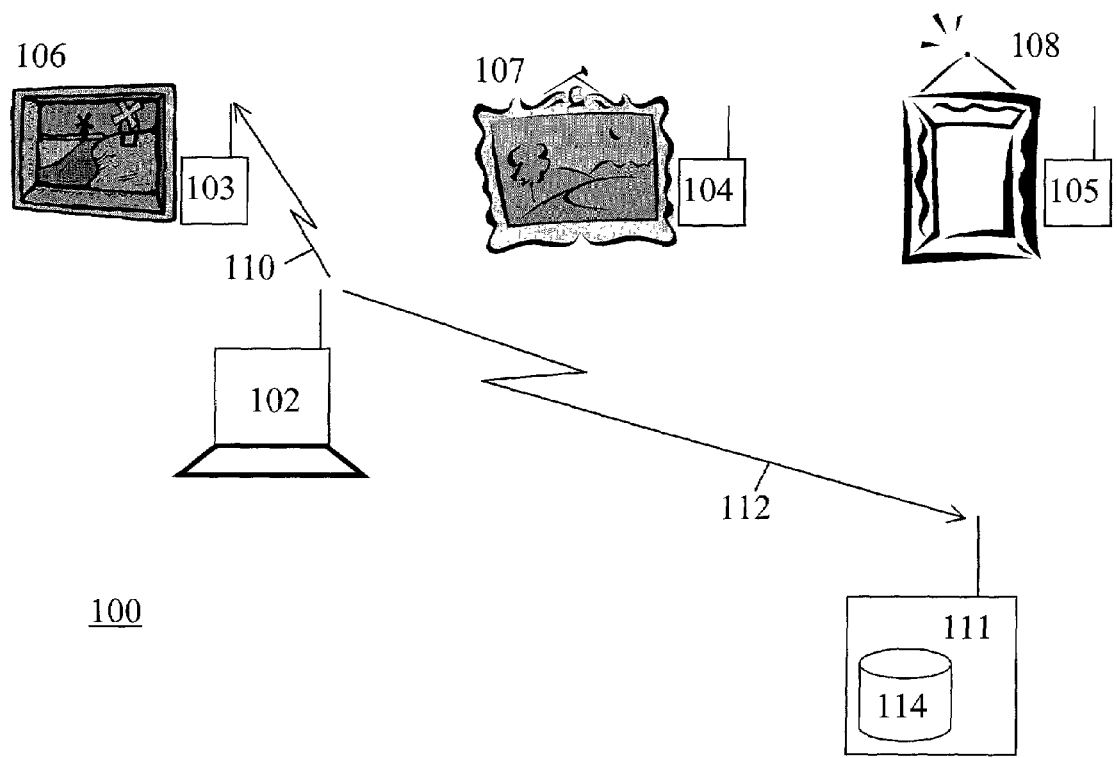
FIG. 1 shows an implementation of a mobile guide communications system according to the present invention.

FIG. 1 illustrates an exemplary mobile guide system 100. The system may be used in a museum or at an art exhibition or the like, to give a visitor information concerning the different exhibition objects 106, 107, 108 which may be paintings or pictures. The information may be interactive, and may be in a multimedia format. The system may include at least one portable terminal 102 for use by one or more visitors. Each portable terminal 102 may be a light-weight unit to facilitate carrying it around in a museum, exhibition or the like. The system may further include one or more object servers 103, 104, 105, which may be located close to an associated exhibition object 106, 107, 108 and a central server 111 which includes information about the objects. An implementation of the mobile guide system 100 may be built as a client/server system.

The system 100 may use any one of various wireless communications technologies such as Bluetooth™ technology or Wireless LAN 802.11b, for transferring information from the central server 111 to the terminal 102. In order to provide relevant information, the system must know which specific object a user is interested in. Therefore, the system 100 must determine the position of the visitor and her terminal 102 in relation to an object that she is closest to and then provide the information associated with that object. In an implementation of the system 100, Bluetooth™ technology is combined with Infra Red (IR) technology to identify an object that is closest to the portable terminal 102. In particular, a user standing close to object 106 would direct the terminal 102 towards an IR sensor (not shown) associated with the object server 103, which is associated with the specific object 106. An IR link 110 is then established, and the object server 103 sends an identification signal associated with the specific object 106 to the terminal 102. The terminal may be connected to the central server 111 via a wireless channel 112, and uses the obtained object identity to request and obtain object information of the specific object 106 from the central server 111. The Bluetooth™ protocol offers smooth information transfer between devices that are up to 20 meters away from each other, the terminal 102 does not have to be oriented towards the server 111, and the terminal does not need a line-of-sight to establish communications.

The IR link 110 only has a range of about one meter and a spread of approximately 30-degrees (a cone shape). Consequently, such a system makes it possible to determine the position of the terminal 102 with an accuracy of approximately one meter. IR links are also directional, so the terminal 102 must be pointed towards the object. This permits the visitor to decide when she wants information, because she must point the portable device toward the object. In such a system, the information transfer only can be initiated from within about one meter from the actual object.

The portable terminal 102 may be a handheld computer, personal digital assistant (PDA), mobile phone or other portable device that includes a display for displaying object information and/or audio capability to provide information to the user. Some information may best be displayed in a multimedia format, and thus a fairly powerful handheld computer having a color display and stereo speakers could be used. For enhanced interactivity, the portable device may include input means so that the visitor may interact with the presented information or multimedia presentation. Such input means might be a mouse, a joystick, a key pad, a pen, a roller-ball device, a touch screen, a microphone using voice recognition software and the like. The portable device 102 further includes an IR communications unit having a transmitter, a receiver and associated software for IR communications with different object servers 103, 104, 105, and a wireless communications unit comprising a transmitter, a receiver and associated software for wireless communications with the central server 111, such as software supporting the Bluetooth™ protocols.

The terminal 102 may include presentation software such as Pocket Internet Explorer™ for displaying information. The terminal 102 may further include mobile guide system application software to control the mobile guide system 100. The mobile guide software may control the wireless and IR communications layers and the presentation layer within the application. A software code means may be adapted to cause the portable device to send a request to an object server 103 to establish an IR connection 110 between the terminal 102 and the object server 103 associated with an object 106, when the portable device 102 is in range of the IR communications unit of the object server 105. A request concerning the identity of the selected object 106 may then be made by the selected server 103 over the IR connection 110. After the identity is obtained from the server 103 over the IR connection, a request may be made over the wireless connection 112 between the device 102 and the central server 111 for information concerning the object 106. The portable device 102 then obtains the object information over the wireless connection 112, and the information is presented at the display of the device 102. The same procedure would be followed to obtain information regarding objects 107 and 108 by establishing communication with object servers 104 and 105, respectively.

In another implementation, the terminal 102 might include a database for storing information concerning objects in an exhibition, information concerning the museum and a description and/or maps to aid a visitor to find various objects. Such information may be available for display to the visitor at any time.

In an embodiment, the portable device terminal 102 may be connectable to a network, and/or to the Internet, which may include a server having additional information associated with specific objects. In such an implementation, the retrieved information can be provided with links to a server or servers in that network, and can easily be connected to the portable device for information retrieval and presentation. The central server may be connected to the Internet to provide Internet access to the portable device.

As discussed above, the system 100 includes a number of object servers 104, 105. Each object server is associated with a specific object or a specific set of objects at an exhibition, and each of them is located close to an object. For example, the object server 104 is associated with the object 106. Each object server includes a memory having information of the identity of the associated object to which that object server is associated.

Each of the object servers further includes an IR communications unit having a transmitter, a receiver and software for IR communication with the terminal 102, and can only be accessed when a user is nearby the associated object. This is advantageous because the user does not want information about other objects. Each object server also includes mobile guide system software and software code means. Each object server continuously monitors for portable devices when not communicating with a user. This wait mode is terminated when a portable device comes within range of the IR communications unit, so that an IR connection 110 is established between the terminal 102 and the object server 104 upon a request from the portable device. Associated object identity information is then transferred from the object server to the portable device over the IR link 110. Each object server may be capable of handling information requests from a plurality of users pertaining to the object.

The central server 111 includes or is connected to a database 114 containing records of information such as printed text, pictures, video, and the like relating to the different exhibition objects. Each record includes information relating to a specific object 106, 107, 108 at the exhibition and is associated with the object identity, which is unique to that specific object. Such information may be available in different languages or formats that may be selectable by each user. One or more central servers 111, dependent on the capacity, may be located somewhere near the exhibition. The central server may be a Personal Computer (PC) running software such as Windows™ 2000 and Microsoft Internet Information Services (webserver) (MS IIS). Examples of various other types of web servers that could be used include Apache™ servers, UNIX servers and LINUX servers.

The information may be sorted and stored within the database 114 so that relevant information will be retrieved when searching the object identity within the database 114. The central server 111 may also include a wireless communications unit having a transmitter, a receiver and software for wireless communications with the portable device 102. Such wireless communications may include protocols such as Bluetooth™ or Wireless LAN 802.11b. The central server 111 further includes mobile guide system software, and software code means. The central server 111 functions to establish a wireless connection 112 between the terminal 102 and the central server upon request from the terminal client. Specific object information is then requested by the terminal 102 over the connection 112, the request including an object identity code. The requested information is retrieved from the database 114 by using the received identity code, and is transferred to the terminal 102 over the wireless connection 112.

Figure 2:
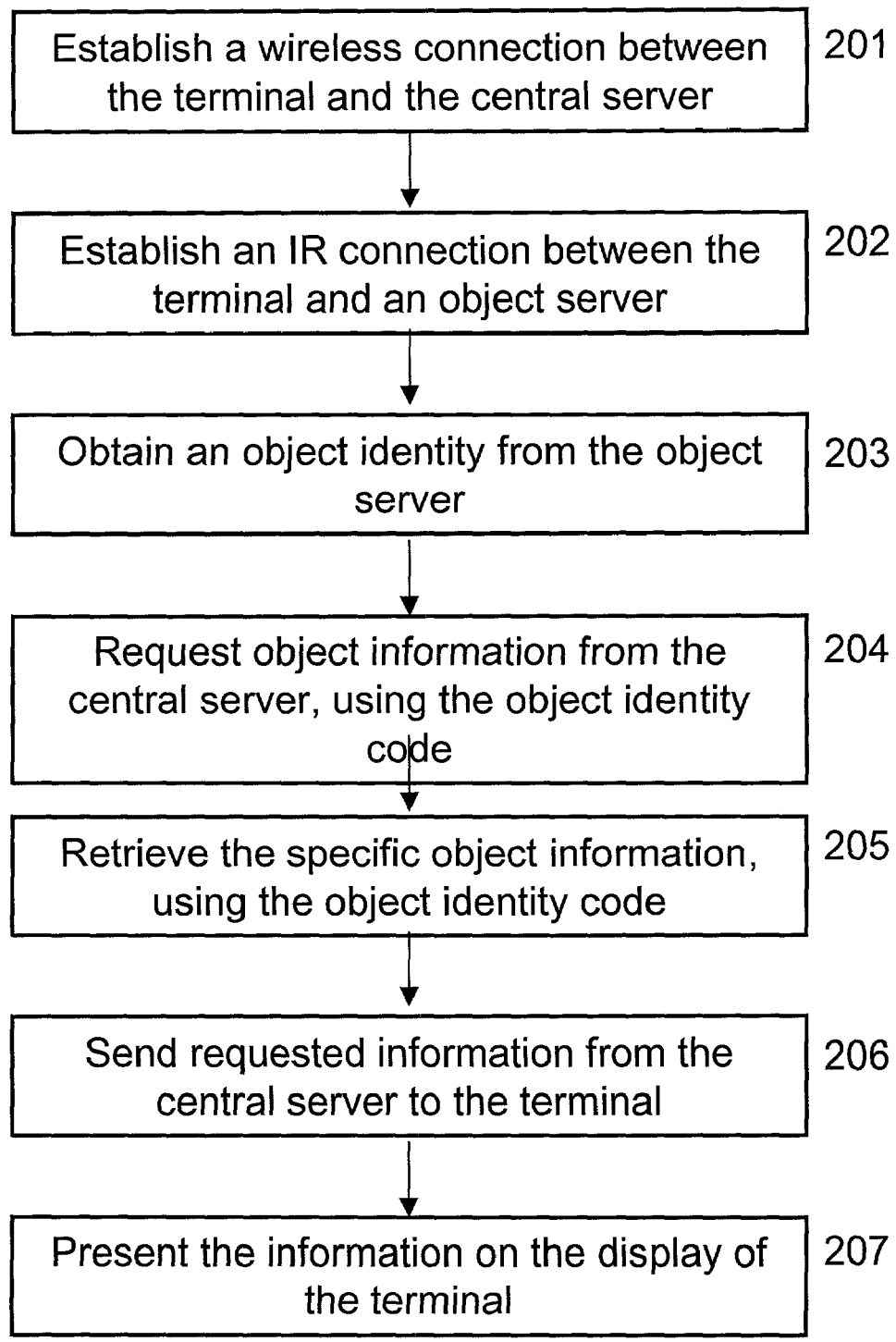
FIG. 2 depicts a flow chart of an implementation of a mobile guide communications method according to the present invention.

FIG. 2 illustrates an implementation of a method for providing a visitor at an exhibition with object related information. The method may be implemented in the mobile guide system 100 described above. In particular, a visitor at an exhibition or the like is provided with a mobile terminal and turns it on. A mobile guide application is started which activates an IR communication routine and launches a presentation program. In addition, wireless communications software is activated and a wireless connection is established 201 between the portable terminal 102 and the central server 111. The visitor then walks around the exhibition and approaches a specific object 106, among the different exhibited objects. The visitor wishes to know more about this object and desires some information about it. The specific object server 103, associated to the specific object, is located close to that specific object and is operating in a wait mode for connecting clients. The visitor brings the portable device 102 within range of the object server transmitter and receiver (approximately 1 meter). He also directs or aims the IR transmitter and receiver of the portable terminal 102 towards the IR transmitter and receiver of the object server 103. When the visitor's terminal 102 is within range of the IR transmitter and receiver of the specific object server 103, an IR connection 110 is established 202. The portable terminal 102 requests and obtains 203 the specific identity of the specific object from the object server 103 over the IR connection 110, and the IR connection 110 is terminated. The visitor then may move away out of the range of the specific object server. Next, the terminal 102 sends a request 204 to the central server 111 over the previously established radio connection, wherein the request contains the specific identity code obtained from the object server. The central server 111 receives the request, and then runs a search 205 of the identities stored in a database 114 by means of the received identity code.

The central server 111 retrieves the specific information from the database 114 and sends 206 the specific information to the requesting portable device 102 over the wireless connection. The specific information is then presented 207 on a display of the portable terminal 102. The information could be of any type and mix of various media, such as text, pictures, movies, audio data such as a speaker's voice, links to the Internet and the like. A menu may be presented to a user to enable a visitor to select the type of presentation (audio, video, text, etc.) to be viewed and/or heard.

The method may be implemented by means of a computer program including software code means for performing the technique. The computer program may be run on processing means in the terminal 102, the object server 103, 104, 105, and the central server 111 within the mobile guide system 100. The computer program may be loaded directly onto the portable device or be loaded from a computer usable medium, such as a floppy disc, a CD, or may be downloaded from a network or from the Internet.

Several implementations of the invention have been described. But various modifications may be made without departing from the spirit and scope of the invention. Accordingly, other embodiments are within the scope of the following claims.

The invention claimed is:

1. A mobile guide communications system comprising:
   a portable device including a display, an infra-red communication unit, and a wireless communication unit;
   a plurality of object servers, each object server associated with an object and including an infrared communication unit configured to communicate with the portable device; and
   a central server including a wireless communication unit, the central server being configured to retrieve data embodying information concerning a selected object and to transmit the data to the portable device via the wireless communication unit in response to a request by the portable device, wherein the central server is further configured to retrieve the data from a database based on an object identification code, separate from the retrieved data, included in the request;
   wherein the portable device further comprises processing circuitry configured to obtain the object identification code from an object server associated with the selected object, to transmit the object identification code to the central server, to obtain, from the central server, the retrieved data concerning the selected object, and to present the obtained data to a user.

2. The system of claim 1, wherein the display is configured to display at least one of a multimedia presentation, a text display, a graphics display and an audio presentation.

3. The system of claim 1, wherein the portable device further comprises an internet connection.

4. The system of claim 1, wherein the object server further comprises a memory including the object identification code associated with the selected object, and software code for causing the object server to transfer the object identification code in response to a request from a portable device.

5. The system of claim 4, wherein the object server operates in a wait mode until communications are established with a portable device.

6. The system of claim 4, wherein the object server is located within a predetermined distance from its associated specific object.

7. The system of claim 1, wherein the central server includes:
   a database including information associated with different objects at an exhibition; and
   the object identification code associated with each object.

8. The system of claim 7, wherein the central server further comprises software for causing the central server to receive the request for information concerning the selected object.

9. The system of claim 8, wherein the central server is configured for internet access, and wherein the central server further comprises software adapted for causing a terminal client to:
   obtain the object identification code from the object server associated with the selected object, when the terminal is in range of an infrared communications unit of the object server associated with the selected object;
   obtain the requested object information from the central server; and
   present the obtained information.

10. A method in a mobile guide system comprising:
    establishing an infrared connection between a mobile terminal and an object server associated with a specific object;
    transferring an object identification code associated with the specific object from the object server to the mobile terminal over the infrared connection;
    establishing a wireless connection between the mobile terminal and a central server;
    transferring the object identification code to the central server via the wireless connection, wherein the object identification code is included in a request for data that embodies information concerning the specific object;
    retrieving the requested data that embodies information about the specific object from a database accessible by the central server based on the object identification code, wherein the requested data is separate from the identification code;
    transferring the retrieved data that embodies information to the mobile terminal; and
    presenting the information on a display of the mobile terminal.

11. The method of claim 10, wherein the presenting the information comprises presenting at least one of an Internet link, a multimedia display, a text display, a graphics display and an audio presentation.

12. A machine-accessible medium having encoded thereon instructions for causing a machine to:
    establish an infrared connection between a portable device and an object server associated with a selected object;
    obtain an object identification code associated with the selected object from the object server associated with the selected object;
    establish a wireless connection between the portable device and a central server;
    transmit the obtained object identification code to the central server over the wireless connection, wherein the object identification code is included in a request for data that embodies information concerning an object associated with the object identification code;
    enable the central server to retrieve the requested data that embodies information about the selected object from a database accessible by the central server based on the object identification code that is separate from the retrieved data;
    receive from the central server, the requested data that is separate from the transmitted object identification code; and
    display the received information for a user of the portable device.

13. The medium of claim 12, further comprising instructions for causing the portable device to display the information as one of a multimedia presentation, a graphics presentation, a text display, and an audio presentation.

14. A computer-readable medium having stored thereon instructions for causing a digital processing system to perform operations comprising:
- establishing an infrared connection between a portable device and an object server associated with a selected object;
- obtaining an object identification code associated with the selected object from the object server associated with the selected object;
- establishing a wireless connection between the portable device and a central server;
- transmitting the obtained object identification code to the central server over the wireless connection, the object identification code causing retrieval of information concerning the selected object associated with the object identification codes, wherein the information is retrieved from a database accessible by the central server;
- receiving the retrieved data that embodies information concerning the selected object, wherein the received data is separate from the object identification code; and
- displaying the information on a display of the portable device.

15. The medium of claim 14, further comprising instructions to cause the portable device to display the information as one of a multimedia presentation, a graphics presentation, a text display, and an audio presentation.

16. The medium of claim 14, further comprising instructions to cause the machine to obtain the object identification code from the object server over an infra-red link.

17. The medium of claim 14, further comprising instructions to cause the machine to transmit the object identification code over a wireless link to the central server.

18. A mobile guide communications system comprising:
- a portable device for communicating information concerning a selected object to a user, the portable device including a display, an infra-red communication unit, and a wireless communication unit;
- a plurality of object servers, each object server associated with an object and including an infrared communication unit configured to communicate with the portable device; and
- a central server including a wireless communication unit, the central server being configured to retrieve data that embodies information concerning the selected object and to transmit the information to the portable device via the wireless communication unit in response to a request by the portable device, wherein the central server is further configured to retrieve the data from a database based on an object identification code, separate from the retrieved data, included in the request;
- wherein the portable device further comprises processing circuitry configured to obtain the object identification code from an object server associated with the selected object, to transmit the object identification code to the central server, to obtain, from the central server, the retrieved data concerning the selected object, and to present the obtained data to a user.

* * * * *